No. 772,147. PATENTED OCT. 11, 1904.
H. H. HUFF.
APPARATUS FOR BURNING FUEL.
APPLICATION FILED OCT. 1, 1903.
NO MODEL. 3 SHEETS—SHEET 1.
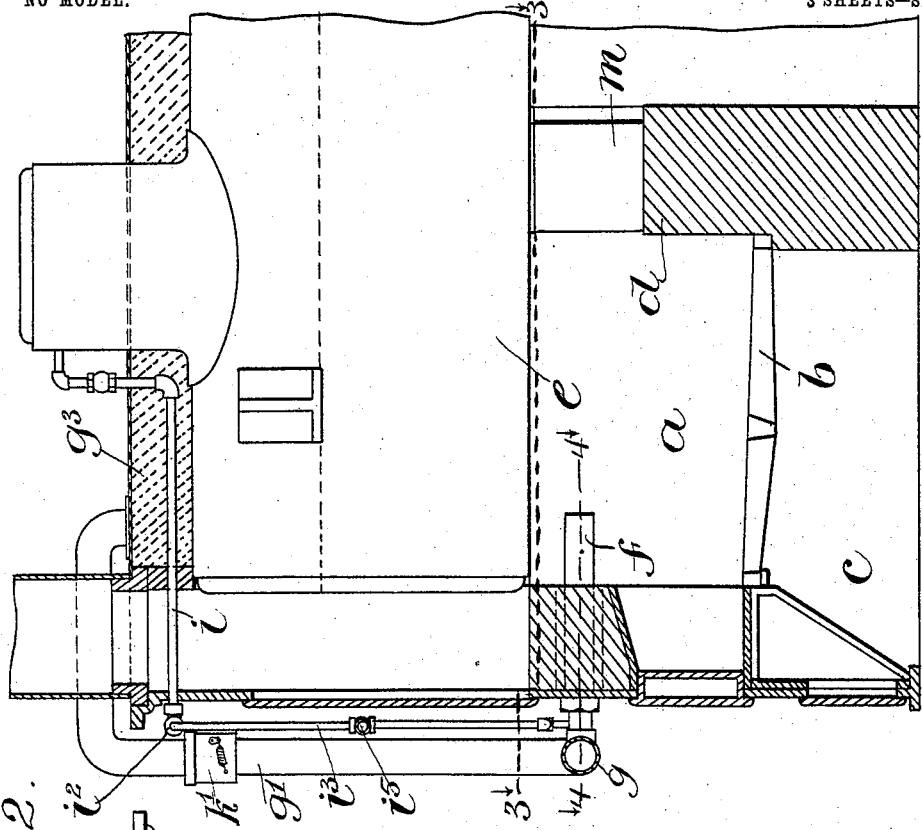
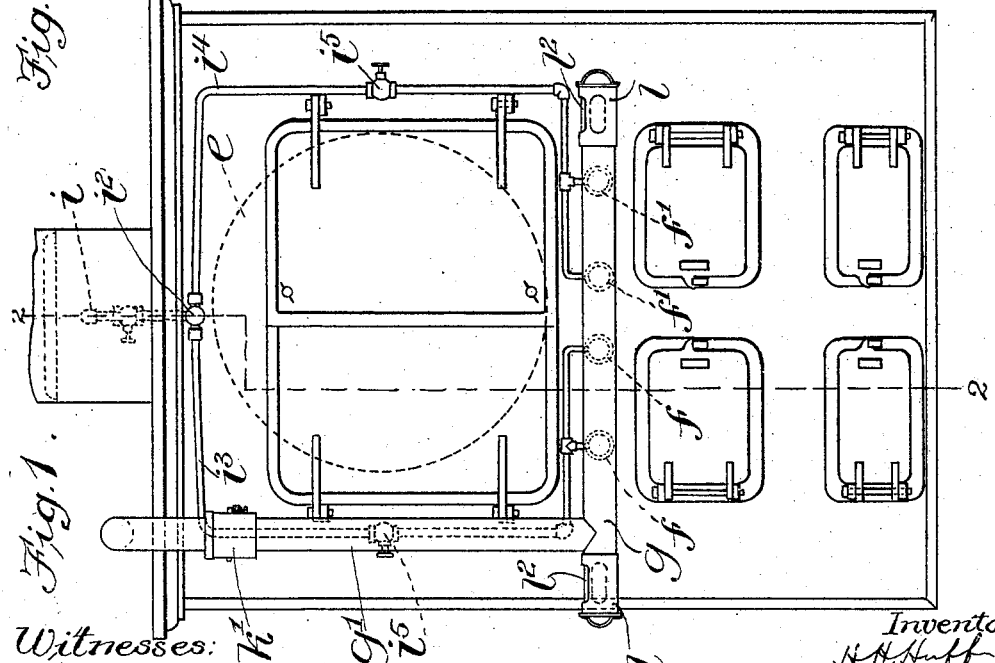
Witnesses:
L. E. Kennedy
E. Batchelder
Inventor:
H. H. Huff No. 772,147. PATENTED OCT. 11, 1904.
H. H. HUFF.
APPARATUS FOR BURNING FUEL.
APPLICATION FILED OCT. 1, 1903.
NO MODEL. 3 SHEETS—SHEET 2.
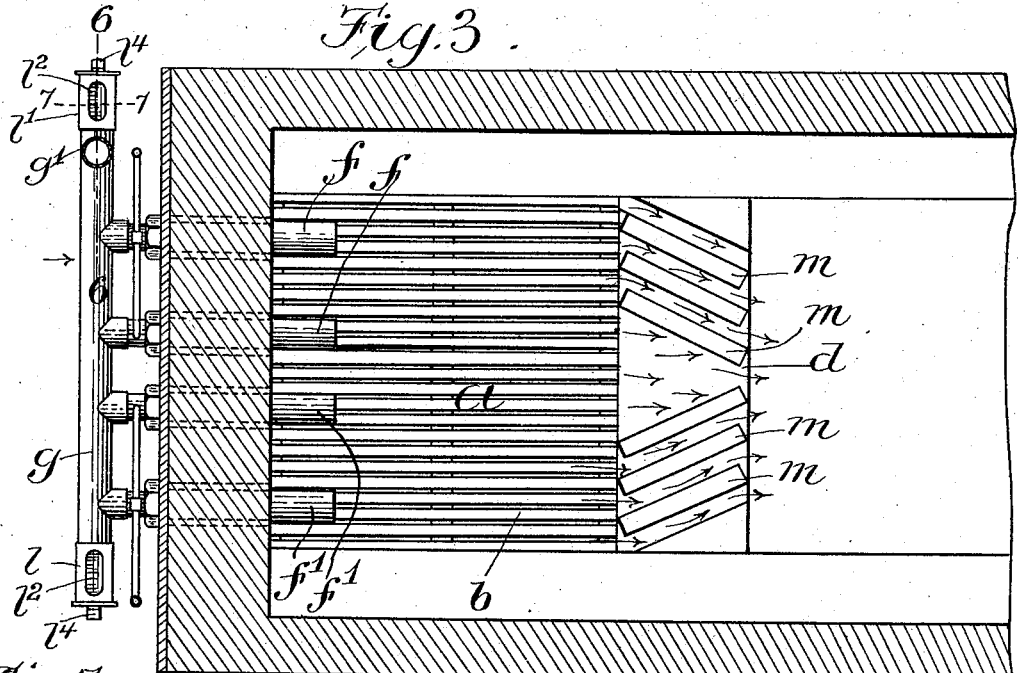
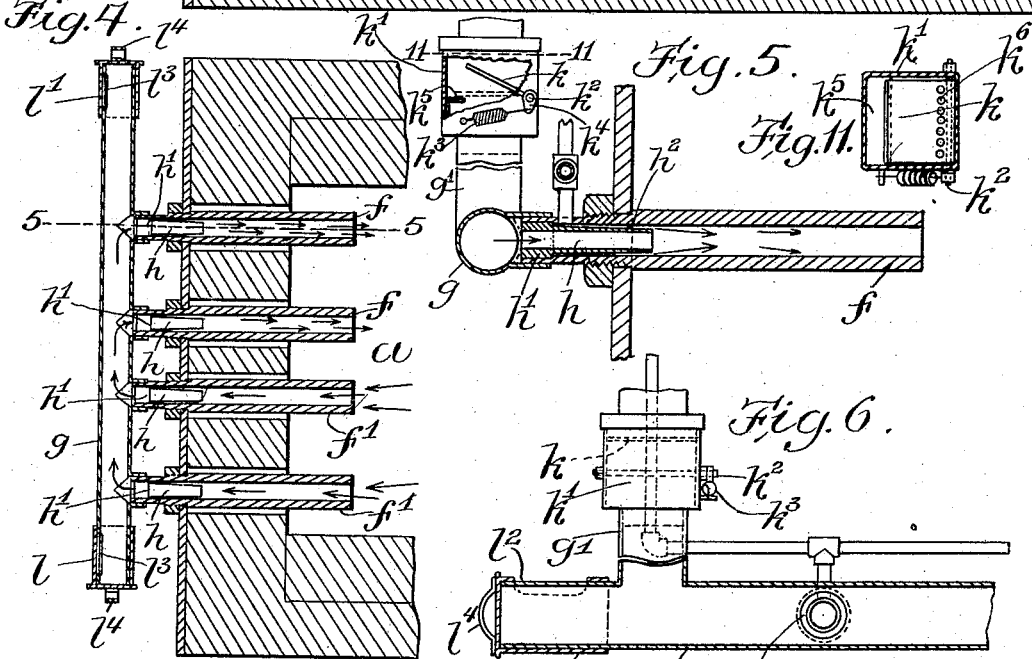
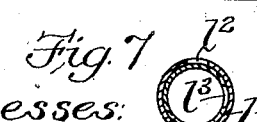
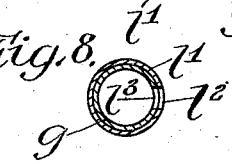
Witnesses:
L. E. Kennedy
E. Batchelder
Inventor:
H. H. Huff
by Wright Brown & Quimby
Attys.

No. 772,147. PATENTED OCT. 11, 1904.
H. H. HUFF.
APPARATUS FOR BURNING FUEL.
APPLICATION FILED OCT. 1, 1903.
NO MODEL. 3 SHEETS—SHEET 3.
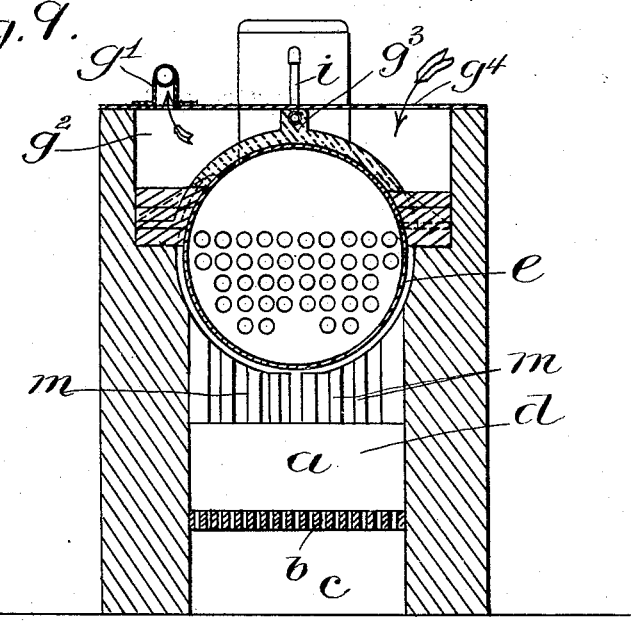
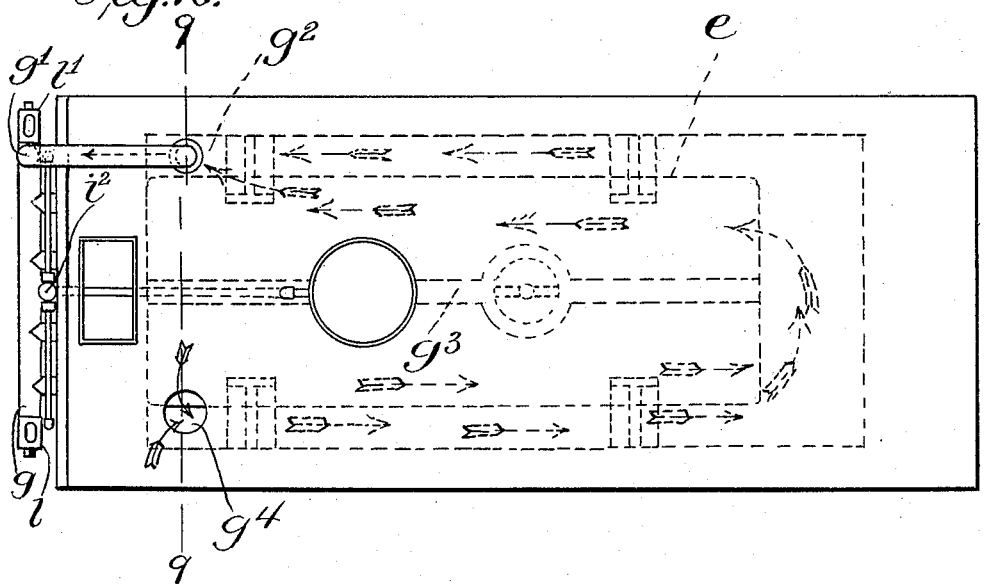
Witnesses:
L. E. Kennedy
E. Batchelder
Inventor.
H. H. Huff
by Wright Brown & Quinby
attys.

No. 772,147.

Patented October 11, 1904.

UNITED STATES PATENT OFFICE.

HENRY H. HUFF, OF BOSTON, MASSACHUSETTS, ASSIGNOR OF ONE-HALF TO SMITH P. BURTON, JR., OF BOSTON, MASSACHUSETTS.

APPARATUS FOR BURNING FUEL.

SPECIFICATION forming part of Letters Patent No. 772,147, dated October 11, 1904.

Application filed October 1, 1903. Serial No. 175,290. (No model.)

*To all whom it may concern:*

Be it known that I, HENRY H. HUFF, of Boston, in the county of Suffolk and State of Massachusetts, have invented certain new and useful Improvements in Apparatus for Burning Fuel, of which the following is a specification.

This invention has for its object to provide a simple, economical, and efficient apparatus for burning fuel; and it consists in the improvements which I will now proceed to describe and claim.

Of the accompanying drawings, forming a part of this specification, Figure 1 represents an end elevation of a boiler-setting embodying my invention. Fig. 2 represents a section on line 2 2 of Fig. 1. Fig. 3 represents a transverse section on line 3 3 of Fig. 2. Fig. 4 represents a section on line 4 4 of Fig. 2. Fig. 5 represents a section on line 5 5 of Fig. 4. Fig. 6 represents a section on line 6 6 of Fig. 3. Fig. 7 represents a section on line 7 7 of Fig. 3. Fig. 8 represents a similar section in a different position. Fig. 9 represents a section on line 9 9 of Fig. 10. Fig. 10 represents a top view. Fig. 11 represents a section on line 11 11 of Fig. 5.

The same letters of reference indicate the same parts in all the figures.

My invention relates more particularly to means for introducing heated air to the combustion-chamber of a boiler-casing and to the circulation of the gases therein.

In carrying out my invention I provide a casing $a$, which is supplied with a suitable grate $b$, an ash-pit $c$, and a bridge-wall $d$.

$e$ represents a boiler mounted in the usual or any suitable way above the combustion-chamber in the casing.

$f\,f\,f'\,f'$ represent branch conduits which are preferably cast-metal tubes secured to the front wall of the casing and projecting into the combustion-space through openings formed in said front wall. The branch conduits in the present instance are four in number and are arranged to be operated in pairs, as will be presently explained. The outer ends of the tubes are suitably connected to a main conduit $g$, extending across the front of the casing, as shown in Figs. 1, 3, and 4. The main conduit $g$ has an upwardly-extending portion $g'$, which communicates with an air-heating chamber $g^2$ in the casing above the boiler. Said chamber is best shown in Figs. 9 and 10 and is provided with a partition $g^3$, of cement or other material, extending longitudinally of the boiler, and an air-inlet $g^4$ for the entrance of outside air, said air-inlet being on the opposite side of the partition from the conduit portion $g'$, so that the entering air in passing through the chamber, as shown by the dotted arrows in Fig. 10, becomes thoroughly heated before entering the conduit $g'$. Each branch conduit is provided at its outer end with an induction-pipe $h$, fitted closely into the conduit and extending inwardly. Said pipe is formed with a shoulder or flange $h'$ at its outer end, so that it may fit the conduit tightly and be held centrally of the same. The pipe $h$ is formed with a slight taper from the shoulder to its end, so that a space $h^2$ is provided between the conduit and the pipe for the introduction of steam.

In Figs. 1 and 2 there is shown a pipe $i$, connected at one end with the dome of the boiler and extending through the front wall of the casing to a T-coupling $i^2$, from which it is carried around the usual clean-out doors and connected with the branch conduits, the arrangement being such that branch pipes $i^3\,i^4$ are formed, each of which is provided with a valve $i^5$, so that steam may be introduced into the branch conduits $f\,f$ and $f'\,f'$ alternately.

It will be seen that the branch conduits are connected with the branch steam-pipes in pairs—that is, the conduits $f\,f$ are connected with the branch pipe $i^3$ and the conduits $f'\,f'$ with the branch pipe $i^4$—so that steam may be introduced into the branch conduits alternately, as will now be explained.

Let it be assumed that fuel, such as coal, has been introduced into the casing and in the ordinary manner until it approximates the incandescent stage. When green fuel is placed on the incandescent fuel in one part—say, for example, the part nearest the branch conduits $f'\,f'$, Figs. 3 and 4—the opening of the valve $i^5$ in the branch pipe $i^3$ permits the flow of steam into the branch conduits $f\,f$ and around the induction-pipes $h$ with sufficient velocity to form a partial vacuum in the main conduit, thereby increasing a draft in the direction indicated by the arrows in Figs. 4 and 5, so that the products of combustion from the green coal are drawn from the casing through the branch conduits $f'\,f'$ and passed through the branch conduits $f\,f$ over the incandescent fuel in another portion of the casing, where they are consumed, so that by firing different parts of the casing alternately the object set forth is accomplished. It will be seen, therefore, that when green fuel is introduced into one part of the casing and has become incandescent the gases from green fuel introduced into another part of the casing will be drawn therefrom into the part of the casing over the incandescent fuel, thereby causing the complete combustion of said gases.

To create a sufficient vacuum in the main conduit, it is necessary to shut off communication between the main conduit and air-heating chamber $g^2$. To this end I have provided a valve $k$, located in the conduit portion $g'$ between the conduit portion $g$ and the air-heating chamber $g^2$. Said valve is mounted in a casing $k'$, preferably square in cross-section, and is pivotally connected with the casing by a rod $k^2$, attached to the valve $k$. The valve is held normally open by a spring $k^3$, one end of which is secured to the casing $k'$ and the other to the free ends of an arm $k^4$ upon the valve-shaft, so that the air may pass to the furnace by normal draft between the intervals of adding fuel. The valve $k$ is preferably provided with perforations $k^6$, formed to permit the passage through the valve of a limited quantity of air when the valve is closed, said perforations being formed to permit the passage of about one-third as much air when the valve is closed as when the valve is open. When steam is admitted through either of the branch conduits, the current of air from the heating-chamber $g^2$ is accelerated and impinges upon the upper side of the valve with sufficient force to close the valve by atmospheric pressure against the seat $k^5$, as shown in Fig. 5.

I have shown registers $l\,l'$ on the ends of the main conduit $g$. Said registers may be adjusted to admit outside air to the main and branch conduits. Each register consists of a sleeve fitting over the main conduit and having an opening $l^2$, adapted to register with a like opening $l^3$ in said main conduit. Each register is provided with a suitable handle $l^4$, whereby it may be turned to cause the openings to register, as in Fig. 8, or to close, as in Fig. 7.

I have shown in Figs. 2, 3, and 9 additional means to insure combustion of the unconsumed products passing over the bridge-wall, said means consisting of blocks or slabs $m$, of fire-brick or other refractory material, placed upon the bridge-wall $d$ and extending upwardly toward the bottom portion of the boiler. Said blocks are placed at an angle to the direction of the heated gases passing over the bridge-wall, and sufficient space is provided between the blocks for the passage of the gases, the heated surfaces of the blocks insuring the combustion of the gases passing between the blocks.

I claim—

1. The combination of a casing, a main conduit, branch air-conduits secured thereto and extending through the wall of said casing, induction-pipes supported by said branch conduits and communicating with said main conduit, and means for passing a current of steam around the exterior of one or more of said induction-pipes, whereby an inward draft or current is induced through the corresponding branch conduits and a simultaneous outward draft or current caused to pass through the remaining branch conduit or conduits, and means for reversing the direction of said draft or current, whereby induction and eduction drafts or currents are caused to alternately pass through said branch conduits.

2. The combination of a casing, a main conduit, branch air-conduits communicating therewith and extending through the wall of said casing, induction-pipes supported by said branch conduits and communicating with said main conduit, steam-pipes communicating with said branch conduits intermediate of the ends of said induction-pipes, and means for controlling the steam, whereby induction and eduction drafts or currents are caused to alternately pass through said branch conduits.

3. The combination of a casing, a main conduit, branch air-conduits extending through the wall of said casing, induction-pipes closing the outer ends of said branch conduits and communicating with said main conduits, steam-pipes communicating with said branch conduits intermediate of the ends of said induction-pipes, and means for controlling the steam whereby induction and eduction drafts or currents are caused to alternately pass through said branch conduits.

4. The combination of a casing, a main conduit, branch air-conduits extending through the wall of said casing and provided with annular shoulders, induction-pipes provided with corresponding annular shoulders abutting against said former shoulders, said pipes communicating with said main conduit, steam-pipes communicating with said branch conduits, and means for controlling the steam, whereby induction and eduction drafts or currents are caused to alternately pass through said branch conduits.

5. The combination of a casing, a main conduit, branch conduits communicating therewith and extending through the wall of said casing, means for causing alternate induction and eduction currents to pass through said branch conduits, and an air-heating chamber located in said casing above the boiler, said chamber having a central longitudinal dividing-wall, an inlet being provided on one side of said wall, and an outlet located on the other side of said wall and communicating with said main conduit.

6. The combination of a casing, branch air-conduits extending through a wall of said casing, a main conduit connecting said branch conduits, means for causing induction and eduction drafts or currents to pass alternately through said branch conduits, and means for automatically governing the volume of air entering said main conduit.

7. The combination of a boiler-casing, an air-heating space or chamber in the casing above the boiler, branch air-conduits extending through a wall of the casing below the boiler, a main conduit connecting said air-heating chamber with the branch conduits, means for inducing an inward draft or current through one or more branch conduits to create a partial vacuum in the main conduit and an outward draft in the other branch conduits, and a valve or damper in the main conduit arranged to be closed by atmospheric pressure, and when closed to shut off wholly or partially the air-heating chamber from the branch conduits.

In testimony whereof I have affixed my signature in presence of two witnesses.

HENRY H. HUFF.

Witnesses:
C. F. BROWN,
A. D. HARRISON.